United States Patent
Panetta et al.

(10) Patent No.: US 8,285,070 B2
(45) Date of Patent: Oct. 9, 2012

(54) METHODS AND APPARATUS FOR IMAGE RESTORATION

(75) Inventors: Karen A. Panetta, Rockport, MA (US); Sos Agaian, San Antonio, TX (US); Aaron Greenblatt, Arlington, MA (US)

(73) Assignee: The Trustees of Tufts College, Medford, MA (US)

( * ) Notice: Subject to any disclaimer, the term of this patent is extended or adjusted under 35 U.S.C. 154(b) by 695 days.

(21) Appl. No.: 12/419,632

(22) Filed: Apr. 7, 2009

(65) Prior Publication Data

US 2009/0274386 A1    Nov. 5, 2009

Related U.S. Application Data

(60) Provisional application No. 61/042,866, filed on Apr. 7, 2008.

(51) Int. Cl.
*G06K 9/40* (2006.01)

(52) U.S. Cl. ........ 382/266; 382/164; 382/261; 382/263; 382/109; 382/254; 382/113; 382/118

(58) Field of Classification Search .................. 382/266, 382/275, 164, 261, 263, 109, 113, 118, 254
See application file for complete search history.

(56) References Cited

U.S. PATENT DOCUMENTS

| | | | |
|---|---|---|---|
| 5,414,782 | A | 5/1995 | Carasso |
| 5,623,558 | A | 4/1997 | Billawala et al. |
| 5,644,662 | A | 7/1997 | Vuylsteke |
| 5,771,318 | A | 6/1998 | Fang et al. |
| 5,796,874 | A | 8/1998 | Woolfe et al. |
| 6,487,321 | B1 | 11/2002 | Edgar et al. |
| 6,636,645 | B1 | 10/2003 | Yu et al. |
| 6,792,162 | B1 | 9/2004 | Edgar |

(Continued)

OTHER PUBLICATIONS

Notification of transmittal of the International Search Report, the International Search Report and the Written Opinion of the International Searching Authority dated Jul. 15, 2009, PCT/US2009/038350.

(Continued)

*Primary Examiner* — Mike Rahmjoo
(74) *Attorney, Agent, or Firm* — Daly, Crowley, Mofford & Durkee, LLP

(57) ABSTRACT

Methods and apparatus for restoration of a digital image. In one embodiment, a method for repairing a defect in a digital image to provide a restored image comprises determining a plurality of pixel locations to form a neighborhood relating to the defect and whether or not the neighborhood has a well-defined, dark border along its edge. Should the neighborhood not have dark border, one embodiment of the method entails processing the neighborhood to bring the neighborhood approximately to uniform darkness, processing the neighborhood to match surroundings in the digital image, copying an edge of a neighborhood in the digital image into the processed neighborhood, processing pixels of the edge to repair the copied edge pixels, and outputting the restored image for display to a user. Should the neighborhood have a dark, well-defined border, one embodiment of the method entails processing the neighborhood as to locally enhance the neighborhood and match its surroundings in the digital image; processing the neighborhood's edge such that the edge also matches its surroundings in both the defect and the digital image; processing the neighborhood to invert its pixel values and then perform the last two steps once again; processing the neighborhood to increase its contrast and then perform the last three steps once again; processing the neighborhood to bring the neighborhood to a more uniform darkness; processing the uniform darkness neighborhood to match surroundings in the digital image; and outputting the restored image for display to a user.

16 Claims, 10 Drawing Sheets

U.S. PATENT DOCUMENTS

| | | | |
|---|---|---|---|
| 6,879,735 | B1 | 4/2005 | Portniaguine et al. |
| 7,181,084 | B2 | 2/2007 | Jostschulte |
| 2003/0086105 | A1 | 5/2003 | Jostschulte |
| 2005/0094845 | A1 | 5/2005 | Lee et al. |
| 2006/0010095 | A1 | 1/2006 | Wolff et al. |
| 2006/0067574 | A1 | 3/2006 | Perlmutter et al. |
| 2008/0144966 | A1 | 6/2008 | Steinberg et al. |

OTHER PUBLICATIONS

Written Opinion of the International Searching Authority, dated Jul. 15, 2009, PCT/US2009/038350.

Panetta et al., "Human Visual System-Based Image Enhancement and Logarithmic Contrast Measure", Feb. 1, 2008, vol. 38, No. 1, pp. 174-188.

Kunda et al., "Thresholding for Edge Detection Using Human Psychovisual Phenomena", Dec. 1986, Pattern Recognition Letters 4, pp. 433-441.

Lie et al., "Data Hiding in Images With Adaptive Numbers of Least Significant Bits Based on the Human Visual System", Department of Electrical Engineering, National Chung Cheng University, 1999, IEEE, pp. 286-290.

Wood et al., "Image Identification and Restoration in the Subband Domain", Rensselaer Polytechnic Institute, 1992, IEEE, pp. III-297-III-300.

Wharton et al., "A Logarithmic Measure of Image Enhancement", Proc, of SPIE, vol. 6250, 2006, pp. 1-12.

Notification Concerning Transmittal of International Preliminary Report on Patentability (Chapter 1 of the Patent Cooperation Treaty), PCT/US2009/038350, Date of mailing Oct. 7, 2010, 2 pages.

Written Opinion of the International Searching Authority, PCT/US2009/038350, Date of mailing Oct. 7, 2010, 8 pages.

U.S. Appl. No. 12/411,716, filed Mar. 26, 2009, file through Dec. 23, 2010, 121 pages.

Notification of transmittal of the International Preliminary Report on Patentability (Chapter 1 of the Patent Cooperation Treaty) dated Oct. 21, 2010, PCT/US2009/039765.

Written Opinion of the International Searching Authority, dated Oct. 21, 2010, PCT/US2009/039765.

Notification of Transmittal of the International Search Report and the Written Opinion of the International Searching Authority, or the Declaration, PCT/US2009/039765 dated Nov. 2, 2009, 6 pages.

Written Opinion of the International Searching Authority, PCT/US2009/039765 dated Nov. 2, 2009, 16 pages.

Greenblatt, A. et al: "Restoration of semi-transparent blotches in damaged texts, manuscripts, and images through localized, logarithmic image enhancement", Communications, Control and Signal Processing, 2008. ISCCSP 2008. 3$^{rd}$ International Symposium on, IEEE, Piscataway, NJ, USA, Mar. 12-14, 2008, pp. 484-489, XP031269118. ISBN: 978-1-4244-1687-5, 6 pages.

Greenblatt, A. et al: Restoration of images damaged by semi-transparent water blotches using localized image enhancement:, Proceedings of SPIE—The International Society for Optical Engineering—Mobile Multimedia/Image Processing, Security, and Applications 2008. SPIE US, vol. 6982, Mar. 19-Apr. 3, 2008. XP002551727, 10 pages.

Crawford, A.J. et al: "Multi-Scale Semi-Transparent Blotch Removal on Archived Photographs using Bayesian Matting Techniques and Visibility Laws", Image Processing, 2007. ICIP 2007. IEEE International Conference on, IEEE, PI, Sep. 1, 2007, pp. I-561, XP031157803. ISBN: 978-1-4244-1436-9, 4 pages.

Stanco, F. et al: "Virtual restoration of vintage photographic prints affected by foxing and water blotches", Journal of Electronic Imaging SPIE-Int. Soc. Opt. Eng USA, vol. 14, No. 4, Oct. 2005, pp. 43008-1, XP002551728. ISSN: 1017-9909, 10 pages.

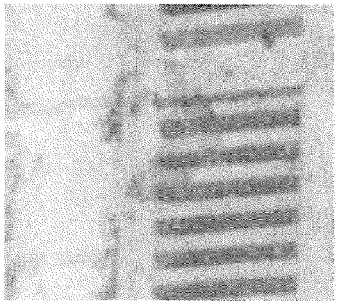
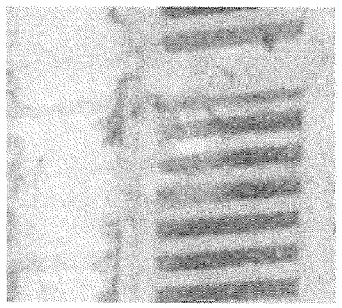
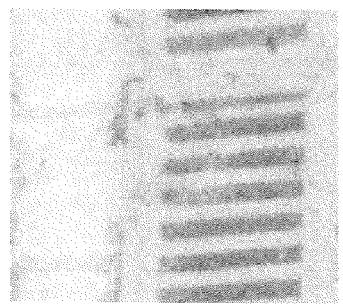
*FIG. 8A*  *FIG. 8B*  *FIG. 8C*
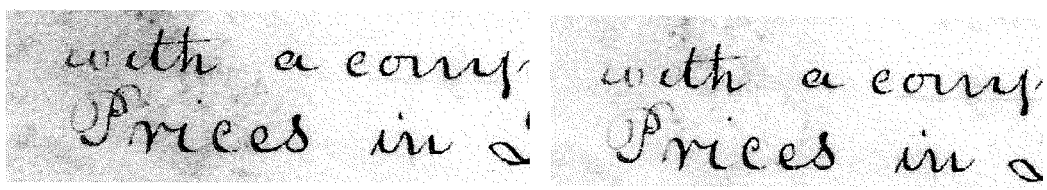
*FIG. 9A*  *FIG. 9B*
*FIG. 10A*  *FIG. 10B*

METHODS AND APPARATUS FOR IMAGE RESTORATION

CROSS REFERENCE TO RELATED APPLICATIONS

The present application claims the benefit of U.S. Provisional Patent Application No. 61/042,866, filed on Apr. 7, 2008, which is incorporated herein by reference.

BACKGROUND

Since the inception of primitive information storage and communication through devices such as carvings in stone and wood, data has played an increasingly important role in society. In more modern times, inventions such as written language, the printing press, and photography have enabled communication between people on a global scale. Countless reams of history are stored on both printed and photographic paper. Since many of these paper documents are degrading rapidly, the risk of losing many primary source records documenting our modern history is considerable.

Damage to antique documents falls into the categories of mechanical and chemical. Mechanical damage includes defects such as cracks and scratches. Cracks generally do not have a common direction, whereas scratches usually have a specific orientation. Chemical damage occurs in the forms of semi-transparent blotches, gaps, and foxing. Semi-transparent blotches are frequently caused by water or humidity and cause each pixel to contain both noise and information about the original image. Gaps are caused by reactions between chemical agents and the film's gelatin, leaving a single gray level in a section of the image. Foxing creates red-brown areas due to microorganisms. Finally, the image may also be damaged when various materials are deposited on the picture or document's surface.

Many preservation efforts are been underway to protect antique images and documents. The first step has been to protect the original paper documents through means such as environmentally-controlled rooms. Furthermore, numerous documents are restored using chemical techniques. Generally, chemical methods start with a cleaning of the original, proceed to a physical restoration of the media, and conclude with some repainting of the restored media. Though this method improves image quality, it is clearly labor-intensive and the cost of restoring a single image is sizable.

As a solution to the cost problems associated with physical photograph restoration, digital restoration methods have been proposed. With the introduction of high-quality, low-cost color scanners and printers, restoring a photograph becomes a matter of scanning in the original, making modifications in the digital domain, and then either storing the image digitally or reprinting it. Though such an approach appears simple, modifying the scanned image in the digital domain is actually a complicated procedure. Currently, the most commonly used approach is to employ highly-trained operators and commercial software such as Adobe Photoshop or the GNU Image Manipulation Program to restore images. Though restoration through such software is less expensive than chemical restoration, one who is skilled in the art will readily appreciate that software restoration is a time-consuming process. Thus, beyond the cost of scanning the original, damaged documents, current digital photograph restoration still involves great operator expense.

Clearly a completely automated digital photograph restoration technique would reduce operator cost. Many automated and semi-automated approaches have been proposed and digital photograph restoration has been proven to be useful for the following reasons: restoration is reversible and the original document is not damaged; partial or complete automation reduces the amount of time for restoration, thus allowing for the processing of large quantities of images; and finally digital restoration is economical and affordable for any photographer or museum.

While a number of patents describing image restoration techniques have been issued, none provide an automated defect restoration system. U.S. Pat. No. 5,623,558 describes a system in which only completely undefined pixel locations are restored and where parts of the algorithm are not automated. U.S. Pat. No. 5,796,874 describes the restoration of faded images and requires user interaction. U.S. Pat. No. 6,487,321 describes a method for modifying defects in a digital image that are generally caused by analog-to-digital conversion and are not due to defects (e.g., blotches, cracks, and so on) in the original source image. U.S. Pat. No. 6,636,645 B1 describes a system in which noise and blocking artifacts are restored through the use of a user-specified noise table. U.S. Pat. No. 5,771,318 describes an edge-preserving smoothing filter, but does not restore old documents. U.S. Pat. No. 5,414,782 focuses on using partial restorations to retrieve details from images that are typically lost in other restoration techniques. Using these partial restorations, one can then tune parameters for other algorithms. However, this involves significant user interaction. U.S. Pat. No. 6,792,162 automatically enhances a digital negative, but cannot restore old documents. U.S. Pat. No. 6,879,735 presents a method for sharpening a blurred image, but again cannot be used for generalized old document restoration. U.S. patent application Ser. No. 10,887,998 removes semi-transparent artifacts from digital images, but only does so only when the artifacts are caused by contaminants in the optical path to the camera and is not capable of restoring old documents. U.S. patent application Ser. No. 11,236,805 describes as system of identifying and removing semi-transparent blotches; however, the system requires a clean reference image. The present invention does not require a clean reference image for the restoration of images damaged by semi-transparent blotches. U.S. patent application Ser. No. 12/032,670 describes an automated defect restoration system; however, the system only works for correcting dust marks that are generally due to a dusty camera lens and the system cannot restore semi-transparent blotches.

In addition to patents issued in the field of image processing, there is significant existing research on the subject of blotch removal. Existing work broadly falls into the categories of general photograph enhancement techniques, blotch removal from multi-frame film sequences, text enhancement, and blotch removal from single frames, as in the application of document restoration.

In general, several approaches to digital image restoration have been developed. One known approach referred to as histogram equalization, generates a restoration transfer function based upon the cumulative distribution function of the grey levels in an image. In order to overcome contrast losses associated with histogram equalization over the entire image, there is introduced a locally adaptive variant of histogram equalization. In another known approach, a more efficient algorithm can be used. Though this may address some of the performance issues with the approach of histogram equalization, it also demonstrates that histogram equalization may be useful for enhancing the overall contrast of an image and not for local defects such as semi-transparent blotches.

Adaptive nonlinear filters are also commonly used for image enhancement, which, as compared to prior works, improves contrast enhancement while performing noise reduction and edge enhancement. However, in the application of semi-transparent blotches, the parameters required for each blotch are different and unknown.

Another commonly used digital image enhancement technique is anisotropic diffusion. In another approach, a mathematical analysis of an anisotropic diffusion filter for ultrasound images is presented in which ultrasound noise is highly predictable and occurs in well-defined curves. This approach presents an adaptable ultrasound filter that significantly reduces noise in ultrasound images. Since the characteristics of the noise in semi-transparent blotches vary widely, these approaches are not suitable.

Adaptive contrast enhancement is another traditional image enhancement technique for the detection of blood vessels in retinal images. Adaptive contrast enhancement is used to only increase contrast in the area of blood vessels without creating background contrast objects. Though useful for the application of blood vessel detection, when applied to semi-transparent blotches, adaptive contrast enhancement frequently creates bright contrast objects that further corrupt the image.

Another approach to document and image defect removal is to replace damaged data with new pixels. Replacement approaches assume that the damaged areas of the image are completely lost and irrecoverable; therefore the only solution is to generate new data.

An example of a replacement approach includes using texture synthesis methods to generate new patterns to replace missing sections of data in an image. This does not require a regular prototype pattern, such as the mortar lines in a wall of bricks, and works well on natural images. However, this method is not effective for semi-transparent blotches.

Inpainting is another common replacement technique that may work well for repairing cracks in images. Further development of inpainting has been used to effectively remove limitations on the topology of the region to be inpainted. Yet another method of inpainting utilizes Gestaltist's Principle of Good Continuation to interpolate image data based on data from local gray levels and gradients. However, inpainting methods do not restore the original image data, which is a desirable feature for semi-transparent blotch removal.

In another approach, spatial and frequency domain information are utilized for noise reduction in images. Using a prototype image, there is replacement of the noise in an image with new pixels. Run iteratively, the algorithm can repair contiguous sections of the image effectively. However, this approach still replaces information, making it inappropriate for semi-transparent blotches.

In addition to the restoration of individual images, film restoration has seen considerable attention in research. Semi-transparent blotches are one type of defect in film and typically only affect individual frames. Most film restoration algorithms rely on information from several frames, thus making them unsuitable for the applications of document and photograph restoration.

For example, one approach detects blotches by assigning a probability to each pixel of being in a blotch. This probability is generated using both spatial and temporal analysis. Once the probabilities are assigned, they are used as a restoration parameter and anisotropic smoothing is performed to conclude the process. This approach is more robust to noise and errors than prior approaches; however, it does require training data, which is not available for semi-transparent blotches due to the inconsistent nature of each blotch.

Additionally, old film frequently has frame-alignment errors. Using a morphological detector, it can be assumed that the blotches are a local minima or maxima and removes the blotches using a motion estimator and multilevel median filtering. The algorithm performs blotch correction and contrast enhancement simultaneously. However, this requires information from multiple frames, which is not available for still photographs or documents.

In yet another approach, a system combines spatial and temporal information for blotch detection using Dempster-Shafer fusion. Using morphological functions to compare the detected shape with a prototype of a blotch, the system is able to effectively detect blotches in old film sequences, but not single-frame images.

In a further approach, rank ordered differences are employed to compare motion compensated frames and detect blotches and scratches in old film sequences. This approach provides better performance and lower computational load as compared to prior approaches. Similarly, another know system also detects blotches and scratches but utilizes heuristic and model-based methods. However, both methods require information from multiple frames.

In addition to a variety of image restoration techniques, many methods specific to text and handwriting have been developed: One such method introduces the Integral Ratio, which is a two-stage thresholding process designed to separate handwriting from various backgrounds. Another approach introduces a locally-adaptive, parameter-free binarization algorithm that extends upon Niblack's binarization using morphological and gradient-based error correction steps. However, text enhancement methods do not restore the background, thus making them unsuitable for semi-transparent blotch restoration. There has also been significant work in the area of text segmentation, which is a subset of the text binarization problem. One commercial application would be faxed documents, thus providing an incentive to study this problem. Though text binarization approaches effectively restore text, they do not consider the background. Background restoration is required for the removal of semi-transparent blotches, and thus text binarization approaches are not sufficient.

Of the known approaches that are specifically designed for the semi-transparent blotch removal, all have limitations. For example, some approaches leave visible borders around the perimeter of the blotch location and blotch detection involves considerable user interaction that improves upon detection but still requires user interaction for restoration. Another approach improves upon detection but is not user independent. A further approach improves upon other techniques, but assumes that the blotch is in a text document. Another approach presents a wavelet-based technique.

SUMMARY

The present invention provides methods and apparatus for digital restoration of images having defects. Applications of the present invention include the restoration of images damaged by semi-transparent blotches, cracks, fading, and the like. Exemplary embodiments of the present invention are applicable to a wide variety of areas, including medical imaging, object detection and control, image forensics and other.

In one aspect of the invention, a method for repairing a defect in a digital image to provide a restored image comprises determining, using a computer having a processor, a plurality of pixel locations to form a neighborhood relating to the defect and whether the neighborhood has a defined edge, where it is determined that the defined edge is not present, (a) processing the neighborhood to bring the neighborhood to a more uniform darkness, (b) processing the uniform darkness neighborhood to match surroundings in the digital image, (c)

copying an edge of a neighborhood in the digital image into the processed neighborhood, (d) processing pixels of the edge to repair the copied edge pixels, and (e) outputting the restored image for display to a user, where it is determined that the defined edge is present, (f) processing the neighborhood to locally enhance the neighborhood and match surroundings in the digital image, (g) processing the neighborhood edge such that the edge also matches surroundings in the defect and the digital image, (h) processing the neighborhood to invert pixel values and perform steps (f) and (g) again, (i) processing the neighborhood to increase its contrast and performing steps (f)-(h) again, (j) processing the neighborhood to bring the neighborhood to a more uniform darkness, (k) processing the uniform darkness neighborhood to match surroundings in the digital image, and (l) outputting the restored image for display to a user.

The method can further including one or more of the following features: processing the neighborhood to bring the neighborhood to a uniform darkness includes using a localized value derived from local pixel values and statistical values in the neighborhood, processing the uniform darkness neighborhood to match surroundings in the digital image includes a variance parameter, a luminosity parameter, and a tuning parameter, processing the neighborhood to bring the neighborhood to a uniform darkness includes computing: $R(\omega_{x,y})=L(f,g,h,\lambda)$ where $R(\omega)$ represents repaired neighborhood pixels, L is a generic function, processing the uniform darkness neighborhood to match surroundings in the digital image includes computing: $R(\omega)=k(I(\omega))$, where k is a generic function, processing the neighborhood edge also matches surroundings in the defect and the digital image includes computing:

$$R(\omega_{x,y}) = \left(\frac{p(\cdot)}{q(\cdot)}\right)$$

where $K(\omega)$ represents the edge pixels to be restored, and x is a generic function, processing the neighborhood's edge such that the edge also matches its surroundings in both the defect and the digital image includes computing: $R(\omega)=K(\omega_{x,y})\cdot x(\bullet)$ where $K(\omega)$ represents the edge pixels to be restored, and x is a generic function, the set of locations is identified using a separate defect location map such as a mask or any other detection method, restoration occurs using local and/or global image processing, the steps of image restoration are performed using a computer, the process is applied to an image having a plurality of pixel values for any given pixel location including a color value, color planes are separated prior to processing and recombined after processing, the defect includes a semi-transparent blotch, the defect includes text degradation, the defect includes a crack.

In another aspect of the invention, a system comprises a processing and a memory to provide an edge analysis module to detect an edge of a defect in a neighborhood in a digital image, a uniform intensity module to bring the neighborhood to a more uniform darkness, a uniform intensity module to process the uniform darkness neighborhood to match surroundings in the digital image, an edge pixel module to copy an edge of a neighborhood in the digital image into the processed neighborhood, an edge pixel restoration module to process pixels of the edge to repair the copied edge pixels, and an output module to output the restored image for display to a user.

In a further aspect of the invention an article comprises a storage medium containing stored instructions that when executed enable a machine to perform: determining, using a computer having a processor, a plurality of pixel locations to form a neighborhood relating to the defect and whether the neighborhood has a defined edge, where it is determined that the defined edge is not present, (a) processing the neighborhood to bring the neighborhood to a more uniform darkness, (b) processing the uniform darkness neighborhood to match surroundings in the digital image, (c) copying an edge of a neighborhood in the digital image into the processed neighborhood, (d) processing pixels of the edge to repair the copied edge pixels, and (e) outputting the restored image for display to a user, where it is determined that the defined edge is present, (f) processing the neighborhood to locally enhance the neighborhood and match surroundings in the digital image, (g) processing the neighborhood edge such that the edge also matches surroundings in the defect and the digital image, (h) processing the neighborhood to invert pixel values and perform steps (f) and (g) again, (i) processing the neighborhood to increase its contrast and performing steps (f)-(h) again, (j) processing the neighborhood to bring the neighborhood to a more uniform darkness, (k) processing the uniform darkness neighborhood to match surroundings in the digital image, and (l) outputting the restored image for display to a user.

BRIEF DESCRIPTION OF THE DRAWINGS

The foregoing features of this invention, as well as the invention itself, may be more fully understood from the following description of the drawings in which:

FIG. 8A shows an original image;

FIG. 8B show the original image of FIG. 8A processed using a prior art technique.

FIG. 8C shows the original image of FIG. 8A processed in accordance with exemplary embodiments of the invention;

FIG. 9A shows an original image;

FIG. 9B shows the original image of FIG. 9A processed in accordance with exemplary embodiments of the invention;

FIG. 10A shows an original image;

FIG. 10B shows the original image of FIG. 10A processed in accordance with exemplary embodiments of the invention;

DETAILED DESCRIPTION

Figure 1:
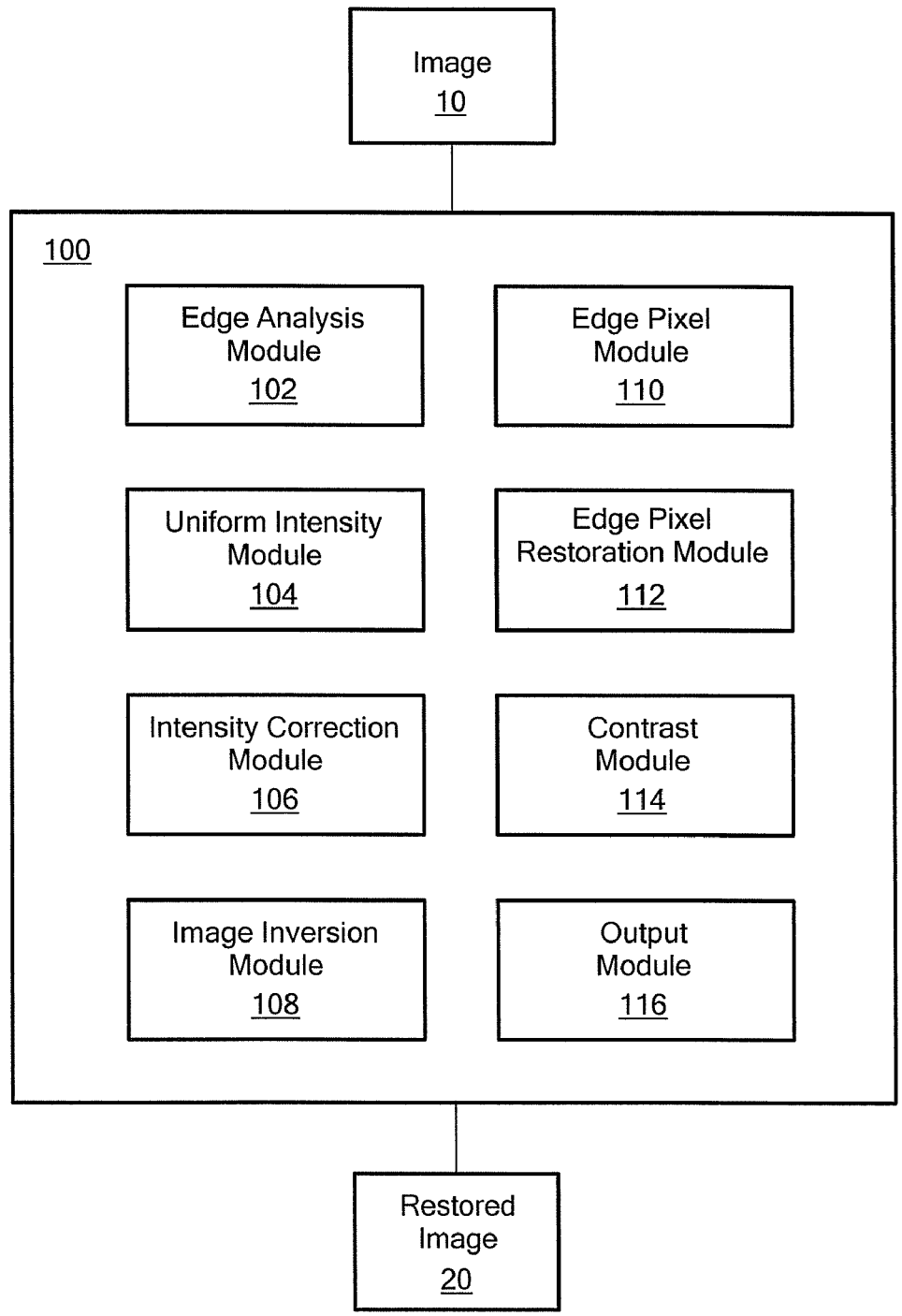
FIG. 1 is a block diagram of an exemplary system for digitally restoring images in accordance with exemplary embodiments of the invention.

FIG. 1 shows an exemplary system 100 for digitally restoring images in accordance with exemplary embodiments of the invention. An image 10 is input to the system for restoration or enhancement. An edge analysis module 102 examines the edge around a selected region. In an exemplary system, the edge analysis module 102 determines whether edge pixels are darker than blotch pixels. If the edge pixels are not darker, a uniform intensity module 104 processes the image including changing the statistics of a selected region in the image. In an exemplary system, the uniform intensity module 104 modifies the blotch and makes its member pixels close to a statistically-selected gray level. An intensity correction module 106 then corrects the blotch intensity.

An edge pixel module 110 copies edge pixels for the blotch from the original image and an edge pixel restoration module 112 restores the edge pixels. An inversion module 108 replaces image values with their compliments and a contrast module 114 increases the contrast of the image. An output module 116 outputs the processed image 20 for display to a user, storage, etc. The processing performed by the modules is described below in detail.

It is understood that the term blotch should be construed broadly to include semi-transparent regions in general having some type of discoloration typically, but not exclusively, formed during aging in less than ideal storage conditions. While exemplary embodiments of the invention refer to blotches as semi-transparent regions in images, such as water stains, it is understood that embodiments of the invention are applicable to images and blotches of any practical size, shape and intensity.

Original images are digitized and analyzed to identify defects. One possible method of identifying defects incorporates image segmentation, thresholding, and constraint selection; however, any suitable method of identifying image objects or defects may be utilized in the present invention. Once the defects are detected, global and/or neighborhood operations are used to restore the image. The inventive processing can be used for detection applications in general and used for applications in many fields that will be readily apparent to one of ordinary skill in the art upon reviewing the present disclosure. These fields include but are not limited to medical imaging, control systems, image forensics, and photograph restoration or enhancement.

Once objects in the image are detected, in the case of image defects, the image can be restored to a more desirable form, irrespective of whether or not an original clean image is not available. Since an individual image may be considered a single frame in a video sequence, exemplary embodiments of the present invention also enable the restoration of defects in video sequences. Automated embodiments of the invention enable video restoration practical. Exemplary embodiments of the invention are applicable to functions in general in which it is desirable to make a decision based upon information within an image.

In one embodiment, there is automatic identification of a set of locations in a digital image, including digital images that are converted from analog sources through the use of a scanner, camera, or other analog-to-digital converter. Any technique, possibly but not necessarily an automated technique, may be used to identify locations within the image. One exemplary method to identify defects in an image involves the following steps: using any suitable image segmentation technique; thresholding the image at multiple values; and selecting the correct threshold using any sequence of processing steps. Once the objects are selected, their locations are stored in memory for use with a variety of applications. When used for image restoration, processing may use local and/or global image processing to aid in determining defect locations. Furthermore, processing of the image may be iterated to restore multiple overlapping defects or to restore edges around defects. When used for general applications, the stored objects in memory are used in conjunction with some other constraint to make decisions that are pertinent to the application.

It is readily understood that detecting defects, such as semi-transparent blotches, is a non-trivial problem due to vague definition. That is, blotches can be of any shape, size, and color and can be caused by a variety of sources, each of which causes different edge effects at the border of the blotch.

In an exemplary embodiment, a blotch/neighborhood is identified in a manner well known in the art, and the blotch is removed from the image also in a manner well known in the art.

The blotch is then processed. In an exemplary embodiment, a Localized Logarithmic Restoration Algorithm (LLRA) uses information contained within the blotch for image restoration through a combination of adaptive and global processing as described below in detail. After repairing the inside of the blotch, the edges of the blotch are adaptively repaired as described below in detail.

Semi-transparent blotches can be caused by a variety of sources and therefore have a variety of edge effects. Blotches created by water spreading through a page have a well-defined, dark edge, while other types of blotches do not. Since blotches with darker edges and blotches without well-defined edges benefit from different processing steps, statistical methods are used to determine whether or not the blotch has a darker edge. One of ordinary skill in the art may readily appreciate that edges may be detected through standard edge detectors, such as Sobel or Canny, using morphological techniques, or using other edge detection techniques.

Figure 2:
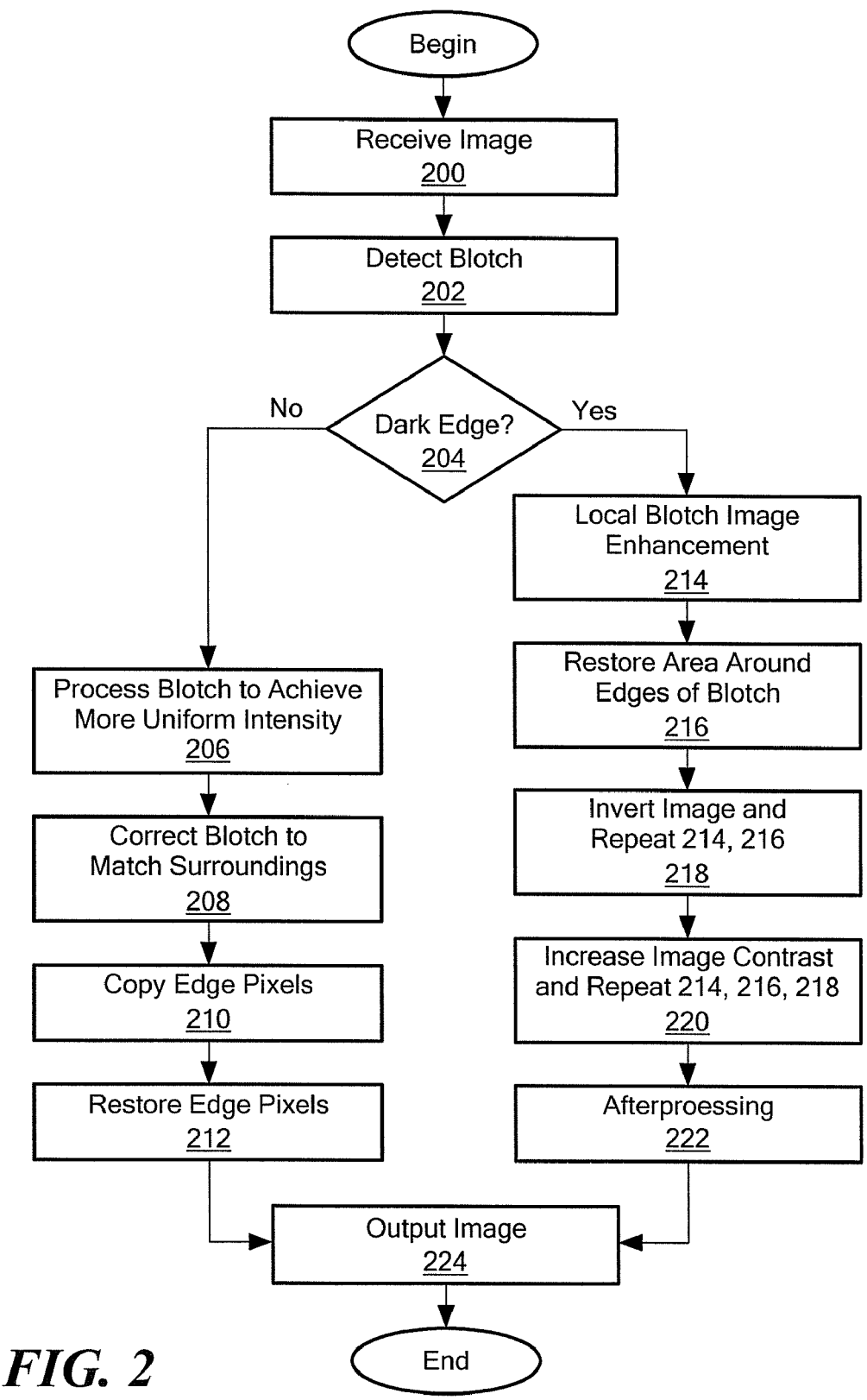
FIG. 2 is a flow diagram showing an exemplary sequence of steps for implementing image restoration in accordance with exemplary embodiments of the invention.
Figure 3A:
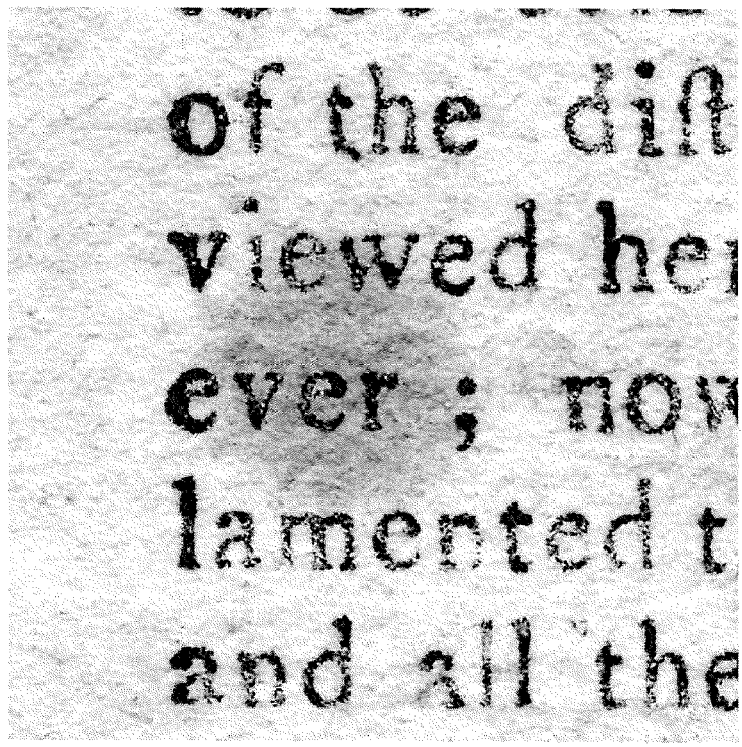
FIG. 3A shows an original image.
Figure 3B:
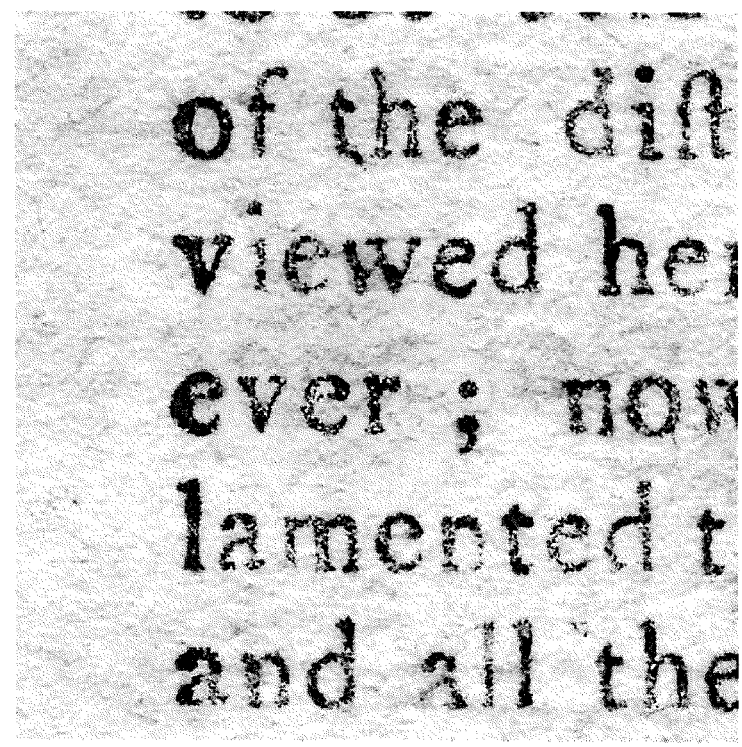
FIG. 3B shows the original image of FIG. 3A processed in accordance with exemplary embodiments of the invention.
Figure 4A:
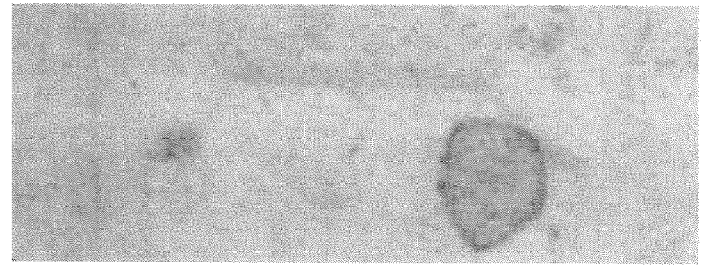
FIG. 4A shows an original image.
Figure 4B:
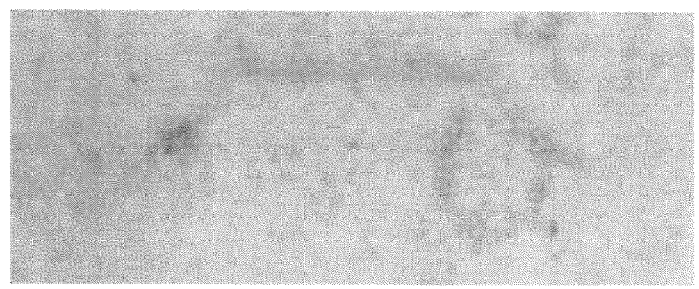
FIGS. 4B and 4C show the image of FIG. 4A processed using prior art techniques.
Figure 4C:
Figure 4D:
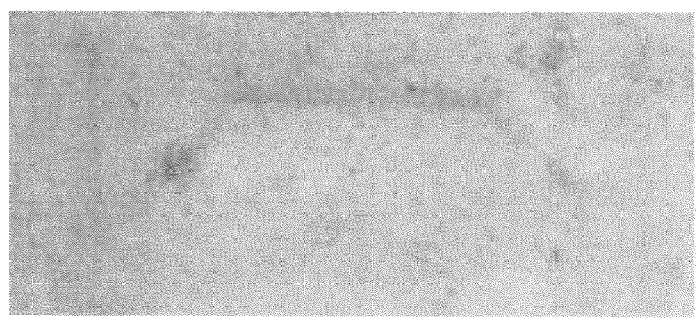
FIG. 4D shows the original image of FIG. 4A processed in accordance with exemplary embodiments of the invention.

FIG. 2 shows an exemplary sequence of steps for processing a blotch. In step 200, a digital image to be processed for restoration is received. In step 202, one or more blotches are detected in a manner well known in the art. In step 204 it is determined whether the blotch has an edge darker than a selected threshold.

If it is determined that there is no darker edge to the blotch then processing on the blotch in step 206 is performed to bring the blotch to a more uniform darkness in accordance with Equations (1) and (2):

$$R(\omega_{x,y}) = L(f, g, h, \lambda) \tag{1}$$

$$\lambda(\cdot) = Z(i(.), j(.)) \tag{2}$$

We have demonstrated the functionality of the present invention using Equations (3) through (7), defined below.

$$f(\cdot) = \mathrm{Median}(I(\omega)) \tag{3}$$

$$g(\cdot) = I(\omega_{x,y}) \tag{4}$$

$$h(\cdot) = 2 \cdot \text{Median}(I(\omega)) \quad (5)$$

$$i(\cdot) = \text{Median}(I(\omega)) - I(\omega_{x,y}) \quad (6)$$

$$j(\cdot) = \text{Median}(I(\omega)) \quad (7)$$

$$L(f, g, h, \lambda) = f(\cdot) \cdot \left(\frac{g(\cdot)}{h(\cdot)}\right)^{\lambda(\cdot)} \quad (8)$$

$$Z(i(\cdot), j(\cdot)) = \frac{i(\cdot)}{j(\cdot)} \quad (9)$$

where $I(\omega)$ represents the pixels within the blotch and $R(\omega)$ represents the repaired blotch pixels at the end of this step. A subscript of x, y indicates that the value is computed at each pixel x, y. Thus, $I(\omega_{x,y})$ means that the value is computed at each pixel x,y within the blotch.

Additionally, we define $\lambda$, f, g, h, i, j, L, and Z as generic functions, where a generic function may be a local function or a function of a neighborhood in the image or a function of the entire image. Any combination of the above functions, or any other mathematical function, is also acceptable, irrespective of where the function derives its data from. A subset of example functions include: average; median; weighted median or average; alpha-trimmed average; arithmetic average, weighted geometric average; mean average, mode average, local transform (e.g. Fourier, cosine, wavelet and others); DC coefficients, and others. Any other function described as a generic function in this document shall be understood to meet the above criteria.

After the blotch is brought to a uniform set of gray levels using Equations (1) and (2) above, in step 208 the blotch is corrected to match the surrounding as set forth in Equations (10):

$$R(\omega) = k(I(\omega)) \quad (10)$$

where k is also a generic function.

In an exemplary embodiment of the invention, functionality is demonstrated using Equations (11) through (17), defined below.

$$k(\cdot) = I(\omega)^{\alpha \cdot \beta \cdot \gamma} \quad (11)$$

$$\alpha = \frac{l(\cdot)}{m(\cdot)} \quad (12)$$

$$l(\cdot) = \log(\text{var}[R(\omega)]) \quad (13)$$

$$m(\cdot) = \log(\text{var}[I(\omega)]) \quad (14)$$

$$\beta = \frac{n(\cdot)}{o(\cdot)} \quad (15)$$

$$n(\cdot) = \log(E[R(\omega)]) \quad (16)$$

$$o(\cdot) = \log(E[I(\omega)^\alpha]) \quad (17)$$

where k, $\alpha$, l, m, $\beta$, n, and o are generic functions.

In one embodiment providing a demonstration of the functionality of the present invention, $\alpha$ corrects for the variance within the blotch, $\beta$ adjusts the overall luminosity of the blotch, and $\gamma$ is an optional tuning parameter. Alpha and beta, defined in Equations (12) and (15), respectively, are generated automatically by taking statistical information from a border surrounding the blotch that is part of the uncorrupted image. In one embodiment, a small area on the border of the blotch is replaced with the Median[$I(\omega)$]. To address this, that area is copied back in step 210 from the original image for further processing.

In step 212, a localized logarithmic restoration algorithm (LLRA) adaptive edge enhancement process repairs the corrupted edges of the blotch as set forth in Equation (18):

$$R(\omega_{x,y}) = \left(\frac{p(\cdot)}{q(\cdot)}\right) \quad (18)$$

where p and q are generic functions.

In one embodiment demonstrating the functionality of the present invention using Equations (19) through (28), which are defined below.

$$p(\cdot)\psi_{x,y} \cdot \text{Median}[I(\omega)] + \omega_{x,y} \quad (19)$$

$$q(\cdot) = 2 \quad (20)$$

$$\psi_{x,y} = \left(\frac{r(\cdot)}{s(\cdot)}\right)^{\gamma_{x,y}} \quad (21)$$

$$r(\cdot) = \omega_{x,y} \quad (22)$$

$$s(\cdot) = 2 \cdot \text{Median}[I(\omega)] \quad (23)$$

$$\gamma_{x,y} = t(\cdot) \cdot u(\cdot) \quad (24)$$

$$t(\cdot) = \frac{v(\cdot) - \omega_{x,y}}{I(\omega)} \quad (25)$$

$$u(\cdot) = \frac{2}{w(\cdot)} \quad (26)$$

$$v(\cdot) = \text{Median}[I(\omega)] \quad (27)$$

$$w(\cdot) = \text{StdDev}[I(\omega)] \quad (28)$$

where p, q, $\psi$, r, s, $\gamma$, t, u, v, and w generic functions.

Note that Equations (19) to (28) are applied only to edges of the blotch so that $I(\omega)$ represents the edge pixels and $R(\omega)$ represents the repaired edge pixels. Once Equations (18) has been applied, the restoration is complete so that the restored image can be output in step 224.

If it is determined that there is a darker edge around the blotch then processing on blotch in step 214 is performed to bring the blotch to a uniform darkness in accordance with the method used in step 208 and Equation (10).

In Step 216, processing is performed to correct the edge around the blotch in accordance with Equation (29):

$$R(\omega) = K(\omega_{x,y}) \cdot x(\bullet) \quad (29)$$

where x is a generic function.

An exemplary embodiment demonstrates the functionality of the present invention using Equations (30) through (33), defined below.

$$x(\cdot) = \exp(\gamma \cdot y(\cdot)) \quad (30)$$

$$y(\cdot) = \text{Median}[\Lambda] \quad (31)$$

$$\Lambda = z(\cdot) \quad (32)$$

$$z(\cdot) = \log\left(\frac{\text{Median}[I(\omega)]}{K(\omega)}\right) \quad (33)$$

where x, y, $\Lambda$, and z are generic functions. In equation (33), $I(\omega)$ is the same set of pixels as referred to in step 214. In Equation (30), $\gamma$ represents an optional tuning parameter.

In step 218, the image is processed and steps 214 and 216 are repeated once. In one embodiment, an image inversion is applied in step 218; e.g., we replace the image with its negative. Step 220 again involves processing using any suitable method to increase the image contrast. After processing in step 220 is completed, processing performed in steps 214, 216, and 218 can be repeated as part of an after processing step 222. The process is concluded with step 222, wherein the same process as described for step 206 followed by the process for step 208 is used as an after processing technique to prepare the image for output in step 224.

In some cases, processing can be used iteratively when there are multiple defects. As described further below, images can be processed twice using LLRA: One due to a crack in the middle and the second due to the presence of multiple blotches on top of one another, for example. Furthermore, LLRA may be used on color images by processing each color plane individually and recombining the color planes once processing has been completed.

FIGS. 3-7 show original images and processed images. Original images include old photographs, printed text, and manuscripts. FIG. 3A shows an original image with a typical blotch in a text document. FIG. 3B shows the image after processing in accordance with exemplary embodiments of the invention. As can be seen, the blotch is effectively removed from the original image with minimal edge effects. FIG. 4A shows an original image with a blotch. FIG. 4B shows the image of FIG. 4A processed using F. Stanco, Apollo software, August 2007 having a blurred edge around the location of the blotch. FIG. 4C shows a result having a well-defined edge using A. J. Crawford, et al, "Multi-Scale Semi-Transparent Blotch Removal on Archived Photographs Using Bayesian Matting Techniques and Visibility Laws," Proc. IEEE International Conference on Image Processing, 2007. FIG. 4D is an image after processing in accordance with exemplary embodiments of the present invention with the edge removed.

Figure 5A:
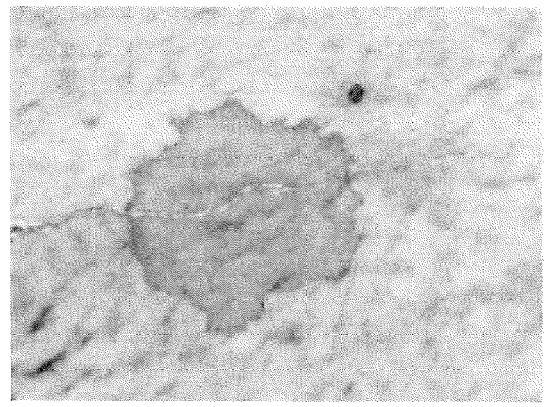
FIG. 5A shows an original image.
Figure 5B:
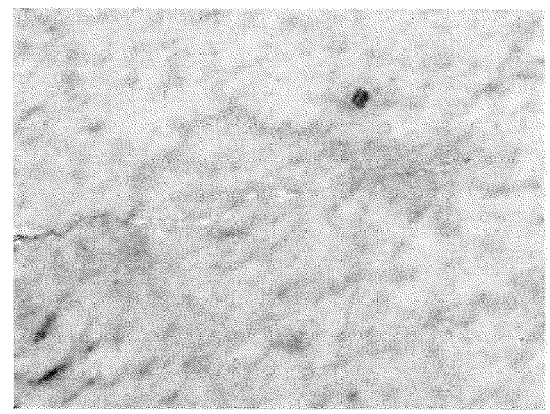
FIG. 5B shows the image of FIG. 5A processed using a prior art technique.
Figure 5C:
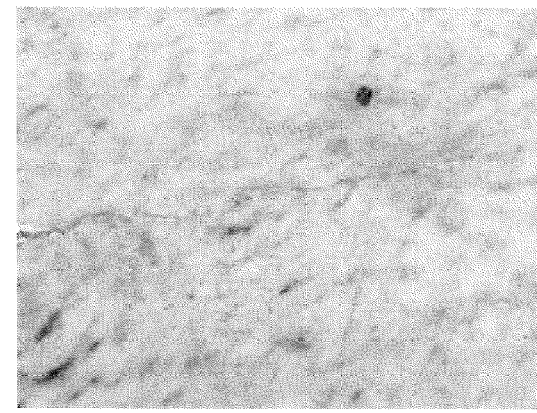
FIG. 5C shows the original image of FIG. 5A processed in accordance with exemplary embodiments of the invention.

FIG. 5A is an original image with a blotch and a crack through the blotch. FIG. 5B shows the image of FIG. 5A processing using Stanco. FIG. 5C shows the processed image in accordance with exemplary embodiments of the invention including iterative processing, first on the blotch and then on the crack, to repair the damage. The inventive processing improves edge removal and enhances detail preservation within the blotch. It also improves the appearance of the crack.

Figure 6A:
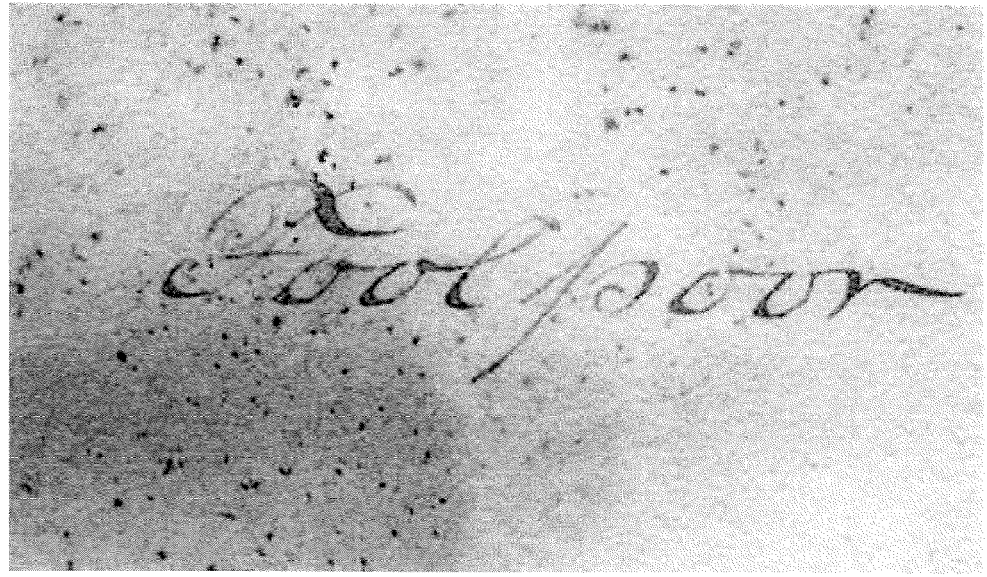
FIG. 6A shows an original image.
Figure 6B:
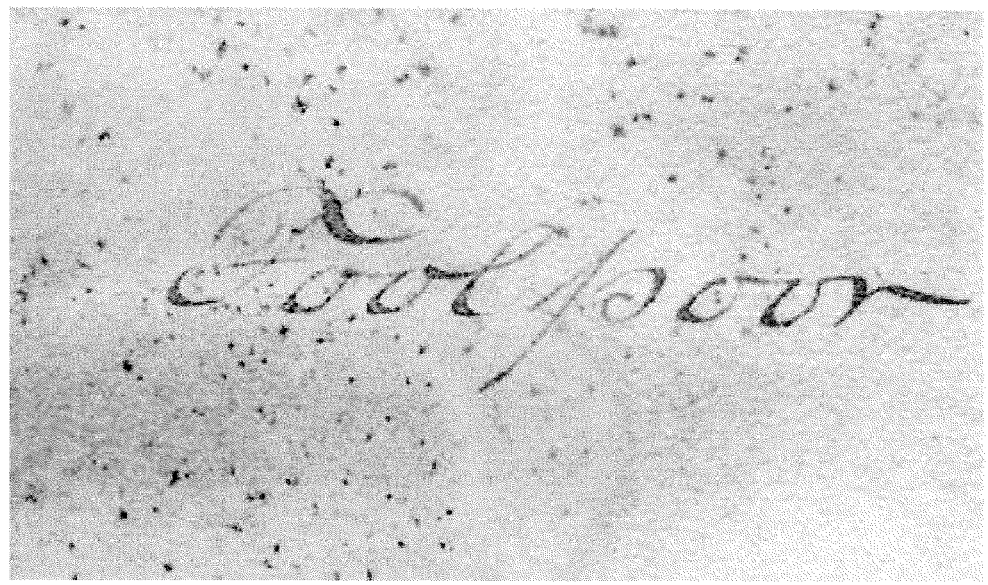
FIG. 6B shows the original image of FIG. 6A processed in accordance with exemplary embodiments of the invention.

FIG. 6A shows an original image of a manuscript having two blotches on top of one another. FIG. 6B shows the image processed in accordance with exemplary embodiments of the invention. In the original image, one can see a lighter blotch that is on the entire left hand side with a darker blotch superimposed on it in the lower left hand corner. The inventive processing was executed once on each blotch to repair the image and generate the image in FIG. 6B.

Figure 7A:
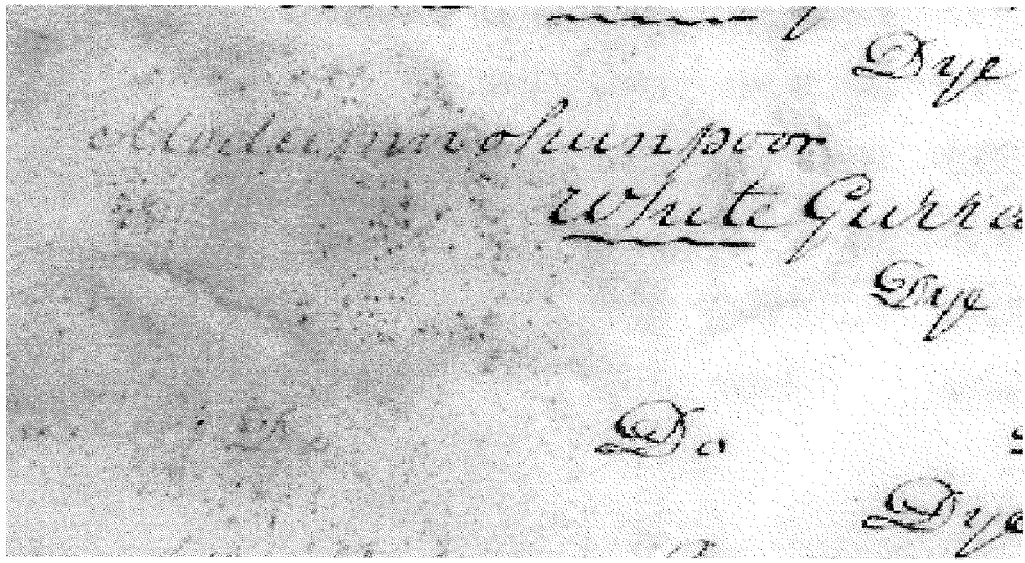
FIG. 7A shows an original image.
Figure 7B:
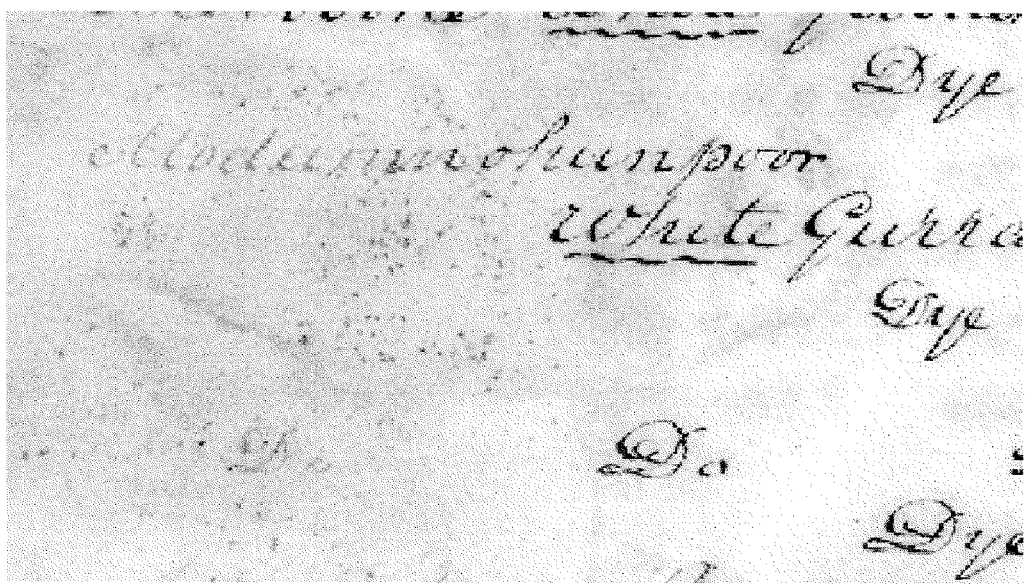
FIG. 7B shows the original image of FIG. 7A processed in accordance with exemplary embodiments of the invention.

FIG. 7A shows an original image of a manuscript where the blotch has significantly degraded the text and FIG. 7B shows the image processed in accordance with exemplary embodiments of the invention. The original images of FIGS. 6A and 7A show documents with blotches caused by mold creating little black dots in the images. In the image of FIG. 7A, in addition to having a blotch caused by mold, the mold has caused significant degradation of the text. While conventional contrast enhancement methods could be used to restore the blotch if masked correctly, in the process, one would also expect the text to be further damaged. By using the inventive processing, the text is not degraded further during restoration. Various text-enhancement algorithms can be applied to the resultant image.

Figure 11A:
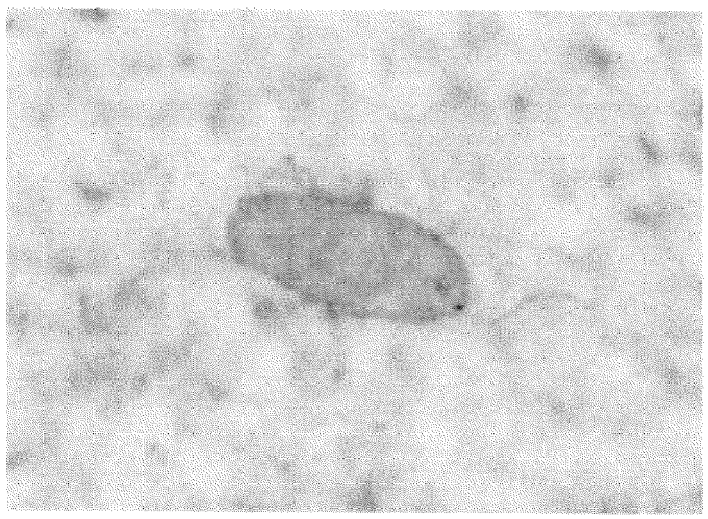
FIG. 11A shows an original image.
Figure 11B:
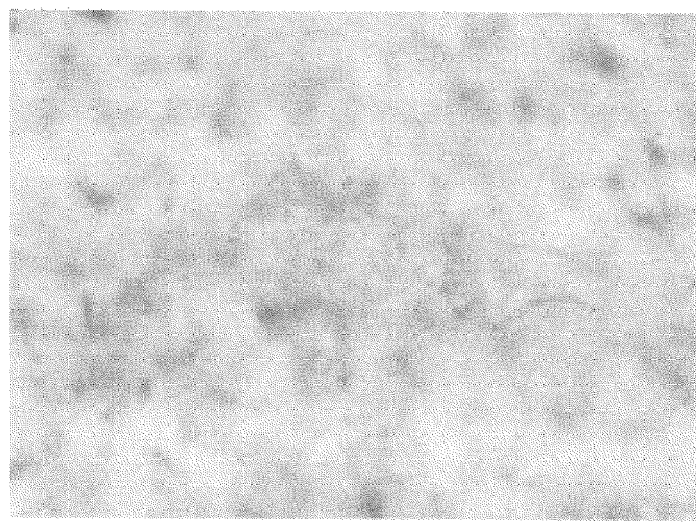
FIG. 11B show the original image of FIG. 8A processed using a prior art technique.
Figure 11C:
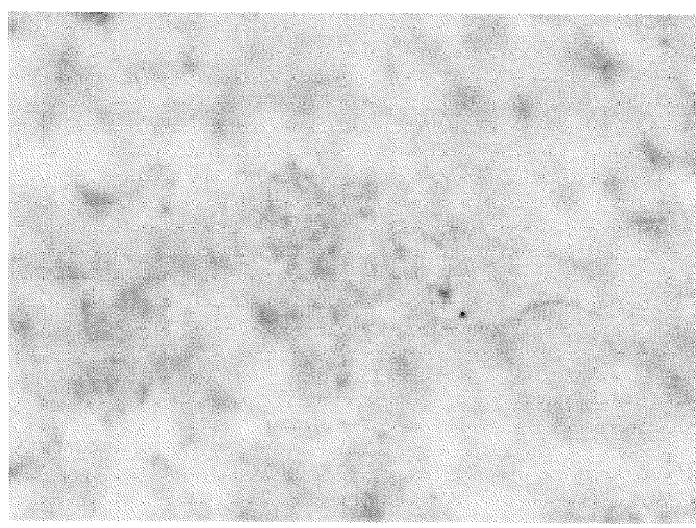
FIG. 11C shows the original image of FIG. 8A processed in accordance with exemplary embodiments of the invention.

FIG. 8A shows an original image. FIG. 8B show the original image of FIG. 8A processed using a prior art technique, and FIG. 8C shows the original image of FIG. 8A processed in accordance with exemplary embodiments of the invention. FIG. 9A shows an original image, and FIG. 9B shows the original image of FIG. 9A processed in accordance with exemplary embodiments of the invention. FIG. 10A shows an original image, and FIG. 10B shows the original image of FIG. 10A processed in accordance with exemplary embodiments of the invention. FIG. 11A shows an original image. FIG. 11B show the original image of FIG. 11A processed using a prior art technique, and FIG. 11C shows the original image of FIG. 11A processed in accordance with exemplary embodiments of the invention;

Exemplary embodiments of the invention provide methods and apparatus for localized logarithmic restoration that provides an adaptive, automatic framework for repairing documents damaged with semi-transparent blotches without blurring the documents or leaving edges around the location of the blotch. Processed images have improved local contrast preservation, expanded saturation reduction capabilities, and improved edge removal, as compared with known restoration processing techniques. The inventive image restoration process can be applied for blotch removal, text enhancement, restoration of cracks, etc., in a variety of documents, including but not limited to texts, manuscripts, and historic images. In addition, the invention image processing is well suited for batch processing of large quantities of documents and images.

Figure 12:
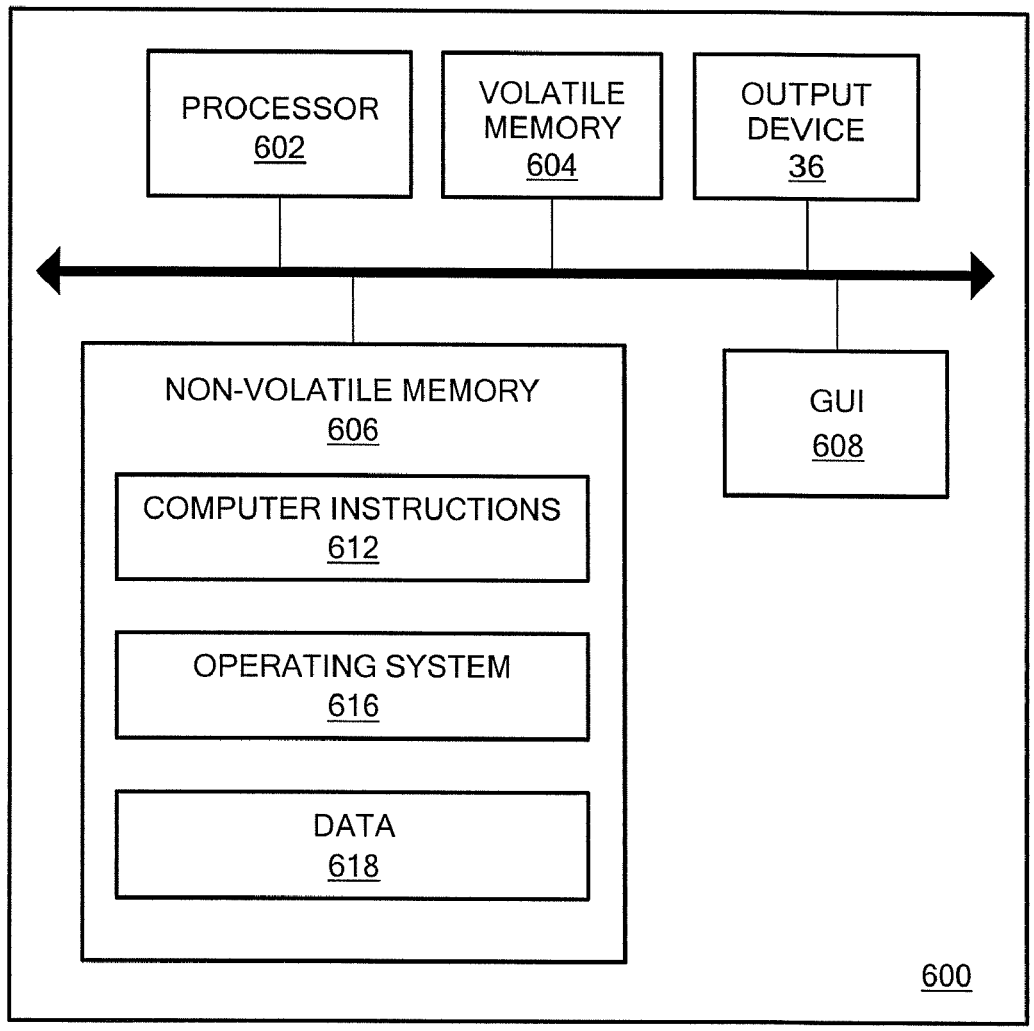
FIG. 12 is a schematic representation of an exemplary system that can execute instructions to perform image restoration in accordance with exemplary embodiments of the invention.

It is understood that exemplary embodiments of the invention described herein can be implemented in a variety of hardware, software, and hardware/software combinations. In one embodiment, the processing for the system of FIG. 1, for example, can be implemented on a computer. FIG. 12 shows an exemplary computer including a processor 602, a volatile memory 604, a non-volatile memory 606 (e.g., hard disk), a graphical user interface (GUI) 608 (e.g., a mouse, a keyboard, a display, for example). The non-volatile memory 606 stores computer instructions 612, an operating system 616 and data 618. In one example, the computer instructions 612 are executed by the processor 602 out of volatile memory 604 to perform all or part of the exemplary processing.

The processing described herein is not limited to use with the hardware and software of FIG. 12; they may find applicability in any computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processes and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing. Processing may also be implemented as a machine-readable storage medium, configured with a computer program, where upon execution, instructions in the computer program cause the computer to operate.

The processing associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)). Elements of different embodiments described herein may be combined to form other embodiments not specifically set forth above. Other embodiments not specifically described herein are also within the scope of the following claims.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method for repairing a defect in a digital image to provide a restored image, comprising:
    determining, using a computer having a processor, a plurality of pixel locations relating to the defect and whether a blotch has an edge darker than a selected threshold;
    where it is determined that the edge is not darker than the selected threshold,
    (a) processing the blotch to bring the blotch to a more uniform darkness;
    (b) processing the uniform darkness blotch to match surroundings in the digital image;
    (c) copying a border of the blotch in the digital image into the processed blotch;
    (d) processing pixels of the border to repair the copied border pixels; and
    (e) outputting the restored image for display to a user;
    where it is determined that the edge is darker than the selected threshold,
    (f) processing the blotch to locally enhance the blotch and match surroundings in the digital image;
    (g) processing the blotch edge such that the edge also matches surroundings in the defect and the digital image;
    (h) processing the blotch to invert pixel values and perform steps (f) and (g) again;
    (i) processing the blotch to increase its contrast and performing steps (f)-(h) again;
    (j) processing the blotch to bring the blotch to a more uniform darkness;
    (k) processing the uniform darkness blotch to match surroundings in the digital image; and
    (l) outputting the restored image for display to a user.

2. The method according to claim 1, wherein processing the blotch to bring the blotch to a uniform darkness includes using a localized value derived from local pixel values and statistical values in the blotch.

3. The method according to claim 1, wherein processing the uniform blotch to match surroundings in the digital image includes a variance parameter, a luminosity parameter, and a tuning parameter.

4. The method according to claim 1, wherein processing the blotch to bring the blotch to a uniform darkness includes computing:

$$R(\omega_{x,y})=L(f,g,h,\lambda)$$

where $R(\omega)$ represents repaired blotch pixels, L is a generic function, $$\lambda(\bullet)=Z(i(.),j(.))$$

$$f(\bullet)=\text{Median}(I(\omega))$$

$$g(\bullet)=I(\omega_{x,y})$$

$$h(\bullet)=2\bullet\text{Median}(I(\omega))$$

$$i(\bullet)=\text{Median}(I(\omega))-I(\omega_{x,y})$$

$$j(\bullet)=\text{Median}(I(\omega))$$

$$L(f,g,h,\lambda)=f(\cdot)\cdot\left(\frac{g(\cdot)}{h(\cdot)}\right)^{\lambda(\cdot)} Z(i(\cdot),j(\cdot))=\frac{i(\cdot)}{j(\cdot)}$$

where $I(\omega)$ represents the pixels within the blotch, subscript of x, y indicates that the value is computed at each pixel x, y, $I(\omega_{x,y})$ means that the value is computed at each pixel x,y within the blotch.

5. The method according to claim 1, wherein processing the uniform darkness blotch to match surroundings in the digital image includes computing:

$$R(\omega)=k(I(\omega))$$

where k is a generic function, $$k(\bullet)=I(\omega)^{\alpha\beta\gamma}$$

$$\alpha=\frac{l(\cdot)}{m(\cdot)}$$

$$l(\bullet)=\log(\text{var}[R(\omega)])$$

$$m(\bullet)=\log(\text{var}[I(\omega)])$$

$$\beta=\frac{n(\cdot)}{o(\cdot)}$$

$$n(\bullet)=\log(E[R(\omega)])$$

$$o(\bullet)=\log(E[I(\omega)^{\alpha}]),$$

where k,$\alpha$,l,m,$\beta$, n, and o are generic functions.

6. The method according to claim 1, wherein processing the blotch edge also matches surroundings in the defect and the digital image includes computing:

$$R(\omega_{x,y}) = \left(\frac{p(\cdot)}{q(\cdot)}\right)$$

$$p(\cdot) = \psi_{x,y} \cdot \text{Median}[I(\omega)] + \omega_{x,y}$$

$$q(\cdot) = 2$$

$$\psi_{x,y} = \left(\frac{r(\cdot)}{s(\cdot)}\right)^{\gamma_{x,y}}$$

$$r(\cdot) = \omega_{x,y}$$

$$s(\cdot) = 2 \cdot \text{Median}[I(\omega)]$$

$$\gamma_{x,y} = t(\cdot) \cdot u(\cdot)$$

$$t(\cdot) = \frac{v(\cdot) - \omega_{x,y}}{I(\omega)}$$

$$u(\cdot) = \frac{2}{w(\cdot)}$$

$$v(\cdot) = \text{Median}[I(\omega)]$$

$$w(\cdot) = \text{StdDev}[I(\omega)],$$

where p, q, ψ, r, s, γ, t, u, v, and w generic functions.

7. The method according to claim 1, wherein processing the blotch edge such that the edge also matches its surroundings in both the defect and the digital image includes computing:

$$R(\omega) = K(\omega_{x,y}) \cdot X(\cdot)$$

where $K(\omega)$ represents the edge pixels to be restored, and x is a generic function, $$x(\cdot) = \exp(\gamma \cdot y(\cdot))$$

$$y(\cdot) = \text{Median}[\Lambda]$$

$$\Lambda = z(\cdot)$$

$$z(\cdot) = \log\left(\frac{\text{Median}[I(\omega)]}{K(\omega)}\right)$$

where x, y, Λ, and z are generic functions, and, γ represents an tuning parameter.

8. The method of claim 1, wherein a set of locations is identified using a separate defect location map such as a mask or any other detection method.

9. The method of claim 1, wherein restoration occurs using local and/or global image processing.

10. The method of claim 1, further including processing an image having a plurality of pixel values for any given pixel location including a color value.

11. The method of claim 1, wherein color planes are separated prior to processing in step (a) and recombined after processing.

12. The method of claim 1, wherein the defect includes a semi-transparent blotch.

13. The method of claim 1, wherein the defect includes text degradation.

14. The method of claim 1, wherein the defect includes a crack.

15. A system, comprising:
a processor and a memory to provide:
an edge analysis module to detect an edge of a defect in a blotch in a digital image;
a uniform intensity module to bring the blotch to a more uniform darkness;
a uniform intensity module to process the more uniform darkness blotch to match surroundings in the digital image;
an edge pixel module to copy an edge of a blotch in the digital image into the processed blotch;
an edge pixel restoration module to process pixels of the edge to repair the copied edge pixels; and
an output module to output the processed image for display to a user.

16. An article, comprising:
a storage medium containing stored instructions that when executed enable a machine to perform:
determining, using a computer having a processor, a plurality of pixel locations relating to a defect and whether a blotch has an edge darker than a selected threshold;
where it is determined that the edge is not darker than the selected threshold,
(a) processing the blotch to bring the blotch to a more uniform darkness;
(b) processing the uniform darkness blotch to match surroundings in the digital image;
(c) copying a border of the blotch in the digital image into the processed blotch;
(d) processing pixels of the border to repair the copied border pixels; and
(e) outputting the processed image for display to a user;
where it is determined that the edge is darker than the selected threshold,
(f) processing the blotch to locally enhance the blotch and match surroundings in the digital image;
(g) processing the blotch edge such that the edge also matches surroundings in the defect and the digital image;
(h) processing the blotch to invert pixel values and perform steps (f) and (g) again;
(i) processing the blotch to increase its contrast and performing steps (f)-(h) again;
(j) processing the blotch to bring the blotch to a more uniform darkness;
(k) processing the uniform darkness blotch to match surroundings in the digital image; and
(l) outputting the restored image for display to a user.

* * * * *

UNITED STATES PATENT AND TRADEMARK OFFICE
CERTIFICATE OF CORRECTION

| | | |
|---|---|---|
| PATENT NO. | : 8,285,070 B2 | Page 1 of 1 |
| APPLICATION NO. | : 12/419632 | |
| DATED | : October 9, 2012 | |
| INVENTOR(S) | : Karen A. Panetta et al. | |

It is certified that error appears in the above-identified patent and that said Letters Patent is hereby corrected as shown below:

In the Specification

Column 1, line 37 delete "are been" and replace with --are--.

Column 5, line 17 delete "including" and replace with --include--.

Signed and Sealed this
Fourteenth Day of October, 2014

Michelle K. Lee
*Deputy Director of the United States Patent and Trademark Office*